United States Patent
Ishiwata et al.

(10) Patent No.: US 11,300,417 B2
(45) Date of Patent: Apr. 12, 2022

(54) INFORMATION PROCESSING DEVICE, INFORMATION PROCESSING METHOD, AND PROGRAM FOR SERVING FOOD AND DRINK AT APPROPRIATE TIMES

(71) Applicant: TOYOTA JIDOSHA KABUSHIKI KAISHA, Toyota (JP)

(72) Inventors: Kazuyuki Ishiwata, Toyota (JP); Takayuki Yano, Nisshin (JP); Shin Sakurada, Toyota (JP); Megumi Amano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 15/929,209

(22) Filed: Jan. 28, 2020

(65) Prior Publication Data
US 2020/0271460 A1 Aug. 27, 2020

(30) Foreign Application Priority Data
Feb. 22, 2019 (JP) .............................. JP2019-030119

(51) Int. Cl.
*G01C 21/34* (2006.01)
*G01C 21/36* (2006.01)
*G06Q 50/12* (2012.01)

(52) U.S. Cl.
CPC ........ *G01C 21/343* (2013.01); *G01C 21/3611* (2013.01); *G01C 21/3647* (2013.01); *G01C 21/3655* (2013.01); *G06Q 50/12* (2013.01)

(58) Field of Classification Search
CPC .............. G01C 21/343; G01C 21/3655; G01C 21/3647; G01C 21/611; G06Q 50/12
See application file for complete search history.

(56) References Cited

U.S. PATENT DOCUMENTS

| | | | |
|---|---|---|---|
| 10,977,606 B1* | 4/2021 | Mimassi | G06Q 50/28 |
| 2008/0162290 A1* | 7/2008 | Leifer | G06Q 10/06 |
| | | | 705/15 |
| 2010/0030569 A1 | 2/2010 | Okano et al. | |
| 2015/0168165 A1 | 6/2015 | Suzuki et al. | |
| 2016/0063473 A1* | 3/2016 | Lee | G06Q 30/0633 |
| | | | 705/15 |

FOREIGN PATENT DOCUMENTS

| | | |
|---|---|---|
| JP | 2010-033484 A | 2/2010 |
| JP | 2014-092498 A | 5/2014 |
| JP | 2015-069594 A | 4/2015 |

* cited by examiner

*Primary Examiner* — Ramsey Refai
(74) *Attorney, Agent, or Firm* — Oblon, McClelland, Maier & Neustadt, L.L.P.

(57) ABSTRACT

An information processing device obtains information concerning a plurality of items of food and drink served to a passenger of a mobile body while the mobile body is moving from a start point to an end point of movement, generates information indicating timing of serving of each of the items of food and drink to the passenger, based on information indicating a period of time provided for allowing the passenger to see a viewing object from the mobile body while the mobile body is moving from the start point to the end point, and outputs the information indicating the timing.

9 Claims, 14 Drawing Sheets

MOVING ROUTE INFORMATION 321

| VIEWING OBJECT ID | ZONE START POINT | ZONE END POINT | START POINT PASSAGE TIME | END POINT PASSAGE TIME | RELEVANCE TO FOOD/DRINK |
|---|---|---|---|---|---|
| | START POINT (DEPARTURE POINT) | | 19:00 | | |
| P1 | P11 | P12 | 19:05 | 19:08 | |
| P2 | P21 | P22 | 19:10 | 19:25 | |
| P3 | P31 | P32 | 19:35 | 19:40 | |
| P4 | P41 | P42 | 19:50 | 20:04 | |
| P5 | P51 | P52 | 20:10 | 20:16 | |
| | END POINT (DESTINATION) | | 20:30 | | |

FIG. 6

FOOD-AND-DRINK INFORMATION
322

| FOOD/ DRINK ID | SERVING ORDER | REQUIRED PREPARATION TIME | PREPARATION TIME | REQUIRED SERVING TIME | SERVING TIME | INTERVAL TO NEXT SERVING |
|---|---|---|---|---|---|---|
| D1 | 1 | | | | D11,D12 | |
| D2 | 2 | | | | D21,D22 | |
| D3 | 3 | | | | D31,D32 | |
| D4 | 4 | | | | D41,D42 | |
| D5 | 5 | | | | D51,D52 | |
| D6 | 6 | | | | D61,D62 | |

INFORMATION PROCESSING DEVICE, INFORMATION PROCESSING METHOD, AND PROGRAM FOR SERVING FOOD AND DRINK AT APPROPRIATE TIMES

INCORPORATION BY REFERENCE

The disclosure of Japanese Patent Application No. 2019-030119 filed on Feb. 22, 2019 including the specification, drawings and abstract is incorporated herein by reference in its entirety.

BACKGROUND

1. Technical Field

The disclosure relates to an information processing device, an information processing method, and a program.

2. Description of Related Art

A navigation system (see, for example, Japanese Unexamined Patent Application Publication No. 2014-092498 (JP 2014-092498 A)) sets a place at which the user can accomplish a certain objective as an action of the user, which is recognized from information entered by the user, as a destination, and sets an alternative place as the destination if the system determines that it is difficult to accomplish the objective. Also, a system (see, for example, Japanese Unexamined Patent Application Publication No. 2010-033484 (JP 2010-033484 A)) recommends a place for a drinking party held in a particular group, such that the place is suitable for participants. Also, a system (see, for example, Japanese Unexamined Patent Application Publication No. 2015-069594 (JP 2015-069594 A)) determines the optimum allocation of mobile objects, based on use conditions of the mobile objects, and created traveling schedules.

SUMMARY

The disclosure provides an information processing device, information processing method, and program, which make it possible to serve food and drink at appropriate times, to a passenger who sees a viewing object from a mobile body.

An information processing device according to one aspect of the disclosure includes a controller configured to obtain information concerning a plurality of items of food and drink served to a passenger of a mobile body while the mobile body is moving from a start point to an end point of movement, generate information indicating timing of serving of each of the items of food and drink to the passenger, based on information indicating a period of time provided for allowing the passenger to see a viewing object from the mobile body while the mobile body is moving from the start point to the end point, and output the information indicating the timing.

Other aspects of the disclosure provide an information processing method and a program each having the same characteristics as the information processing device as described above.

According to the disclosure, the food and drink can be served at appropriate times to the passenger who sees the viewing object from the mobile body.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 shows an example of a data structure of a table of food-and-drink information;

DETAILED DESCRIPTION OF EMBODIMENTS

Figure 1:
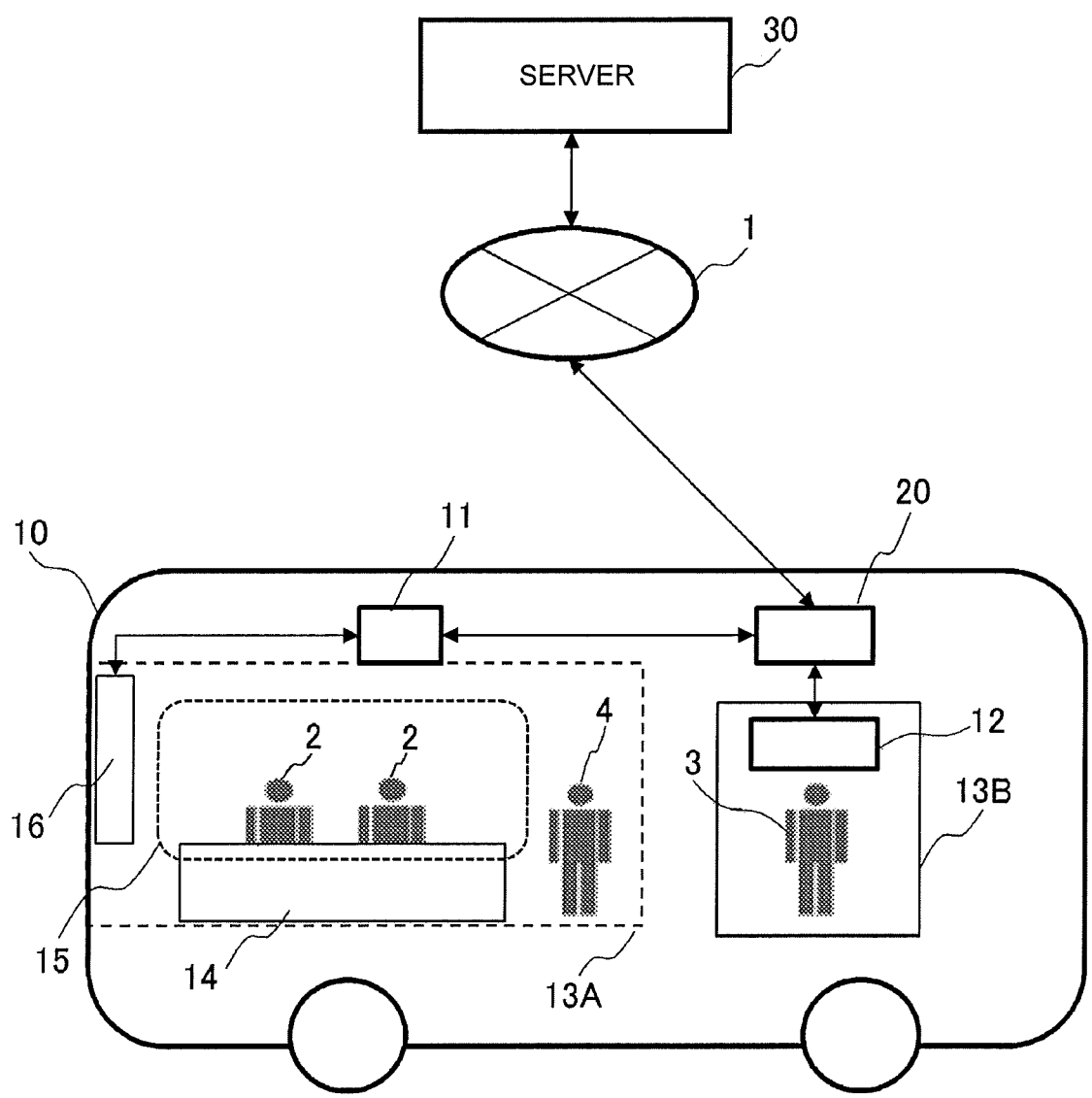
FIG. 1 is a schematic view of a computer system according to a first embodiment.

In an embodiment, an information processing device including a controller that executes tasks as follows will be described.

(1) Obtaining information concerning a plurality of items of food and drink served to a passenger of a mobile body while the mobile body is moving from a start point to an end point of movement.

(2) Generating information indicating timing of serving of each of the items of food and drink to the passenger, based on information indicating a period of time provided for allowing the passenger to see a viewing object from the mobile body while the mobile body is moving from the start point to the end point.

(3) Outputting the information indicating the timing.

The "mobile body" is a device or equipment capable of moving with a passenger or passengers on board, and examples of the "mobile body" include a motor vehicle, rail vehicle, ship, and so forth. The mobile body may use any kind of motive power. The mobile body may be of a type that is driven or operated by an occupant on board, or of a type that is driven or operated via remote operation, or of a type that moves autonomously via automatic driving or automatic operation.

The "viewing object" may be anything provided that there is no reason, such as contrary to public policy, why its public viewing is restricted. Examples of the viewing objects include natural things (such as a mountain, river, sea, lake, rock, tree, and a line of trees), artificial things (e.g., structural objects, such as a building, bridge, and road, mobile bodies, such as a vehicle, ship, and aircraft, statue, painting, video, and so forth), person, animal, and performance by a person or animal. However, the viewing objects are not limited to these examples, but may include scenery and landscape. A passenger may see the viewing object, by directly looking at the object through an opening, such as a window, of the mobile body, or looking at a real-time image of the viewing object, which is captured by a camera and projected on a display device. The number of the viewing objects to be seen between the start point and end point of movement may be set as appropriate.

The above-mentioned items of food and drink include drinks and dishes. For example, the items of food and drink are two or more dishes that constitute a course or set, and drinks. However, types of the dishes and drinks included in the items of food and drink, and a combination thereof, may be determined as appropriate. The number of servings of the food and drink may also be determined as appropriate.

In the information processing device, the controller may be configured to set the timing of serving of each of the items of food and drink to the passenger, such that the timing does not overlap the period of time provided for allowing the passenger to see the viewing object. Thus, viewing of the passenger can be prevented from being disturbed by serving of the food and drink.

Also, in the information processing device, the controller may be configured to set timing of serving of a first food or drink, among the plurality of items of food and drink, to the passenger, such that the period of time provided for allowing the passenger to see the viewing object starts in the case where a predetermined time elapses from an end of serving of the first food or drink. With this configuration, it is possible to secure a period of time in which the passenger concentrates on the first food or drink, enjoys seeing the first food or drink, or checks the taste thereof, within the predetermined time. The length of the predetermined time may be set as appropriate. The start of the time provided for seeing the viewing object in the case where the predetermined time elapses may be at the same time as or later than the lapse of the predetermined time. The first food or drink may be suitably selected from a plurality of items of food and drink. Two or more items of food and drink corresponding to the first food or drink may be included in the plurality of items of food and drink.

In the information processing device, when the time at which a second food or drink to be served next to the first food or drink is served comes earlier than the end of the period of time provided for seeing the viewing object, the controller may be configured to adjust the time at which the second food or drink is served, such that the time comes after the end of the period of time provided for seeing the viewing object. With this configuration, the passenger seeing the viewing object can be prevented from being disturbed by serving of the second food or drink.

Also, the information processing device may include a controller that executes tasks as follows.

(1) Obtaining information indicating periods of time for serving a first food or drink and a second food or drink, respectively, to a passenger of a mobile body, while the mobile body is moving from a start point to an end point of movement.

(2) Selecting a viewing object to be seen by the passenger, during a period from the end of the period of time for serving the first food or drink, to the start of the period of time for serving the second food or drink, from a plurality of candidates of viewing objects, based on information indicating a route on which the mobile body moves to see each of the candidates of the viewing objects.

(3) Generating information indicating a moving route from the start point to the end point of the movement, which moving route incorporates the route on which the mobile body moves to see the viewing object selected.

(4) Outputting the information indicating the moving route.

First Embodiment

An information processing device according to a first embodiment, an information processing method, and a program will be described with reference to the drawings. It is to be understood that the configuration of this embodiment is merely exemplary, and the disclosure is not limited to the configuration of the embodiment.

System Configuration

FIG. 1 schematically shows a system according to the first embodiment. In FIG. 1, the system includes a terminal 20 and a server 30, which are connected to a network 1. For example, the network 1 is a public telecommunication network, such as the Internet, and may adopt WAN (Wide Area Network) and other communication networks. The network 1 may also include a cellular network, such as LTE (Long Term Evolution), and a wireless network, such as wireless LAN (Local Area Network, including Wi-Fi). The terminal 20 is a vehicle-mounted terminal placed in a vehicle 10. The vehicle 10 is one example of the "mobile body".

The vehicle 10 moves with a passenger or passengers on board, between a start point (point of departure) and an end point (destination) of a given movement. A moving route between the start point and the end point may be determined as appropriate, and the start point and the end point may be the same point, or may not be the same point. A part or the whole of the moving route may be a public road or roads. Also, the vehicle 10 traveling along the route may move back and forth on the same road, or may go around.

In the first embodiment, as one example, the vehicle 10 travels (moves) on a predetermined traveling course 50 (see FIG. 2, one example of the moving route) at a set time. The vehicle 10, which is driven by a driver, travels along a predetermined route, at a fixed speed, according to a time schedule. However, the vehicle 10 may be adapted to move via automated driving.

In the first embodiment, it is assumed that the traveling course 50 is located in a site of a theme park (amusement park). The theme park may be a zoo (safari park), aquarium, park, or the like. A part or the whole of the traveling course 50 may be a public road, and it is not required for the entire length of the traveling course 50 to be located within some kind of site.

The vehicle 10 is used as a mobile eating and drinking place that serves food and drink to passengers, as a business. In the vehicle 10, an eating and drinking space 13A for passengers (users) 2, and a kitchen space 13B are provided. Chairs and a table 14 for use by the passengers 2 are located in the eating and drinking space 13A. Cooking facilities are provided in the kitchen space 13B, and a cook 3 prepares dishes, using the cooking facilities. Food and drink (dishes and beverages) and tableware are carried by a wait person (server) 4, into the eating and drinking space 13A, and placed on the table 14. Thus, the food and drink are served to the passengers 2 seated on the chairs, so that the passengers 2 can have meals. The dishes as those of a course or set are served to the passengers 2, with time intervals between successive ones of the foods and beverages, while the vehicle 10 is traveling on the traveling course 50.

The vehicle 10 includes a camera 11, display 12, and large-sized display 16 respectively connected to the terminal 20, in addition to the terminal 20 as described above. The camera 11 images the surroundings of the vehicle 10. Images captured by the camera 11 are displayed on the large-sized display 16 installed in the eating and drinking space 13A, and the passengers 2 can see real-time images of the surroundings of the vehicle 10. The number of camera(s) 11 may be one, or two or more, and a suitable number of cameras 11 are provided in the vehicle 10. Each camera 11 is connected to the terminal 20, and the line of sight and angle of view of the camera 11 are adjusted, under control of the terminal 20.

A window 15 is formed in the eating and drinking space 13A, and the passengers 2 can directly see the surroundings of the vehicle 10, through the window 15. A deck may be provided on a roof portion of the vehicle 10, and chairs and tables may be placed on the deck, such that the passengers 2 can have a meal while seeing the surroundings of the vehicle 10.

The display 12 is installed in the kitchen space 13B. Information indicating time to prepare dishes, and time to serve the dishes and beverages, is displayed on the display 12, under display control of the terminal 20. The cook 3 prepares dishes and the wait person 4 serves the dishes, according to the times displayed, by referring to the display content on the display 12.

Figure 2:
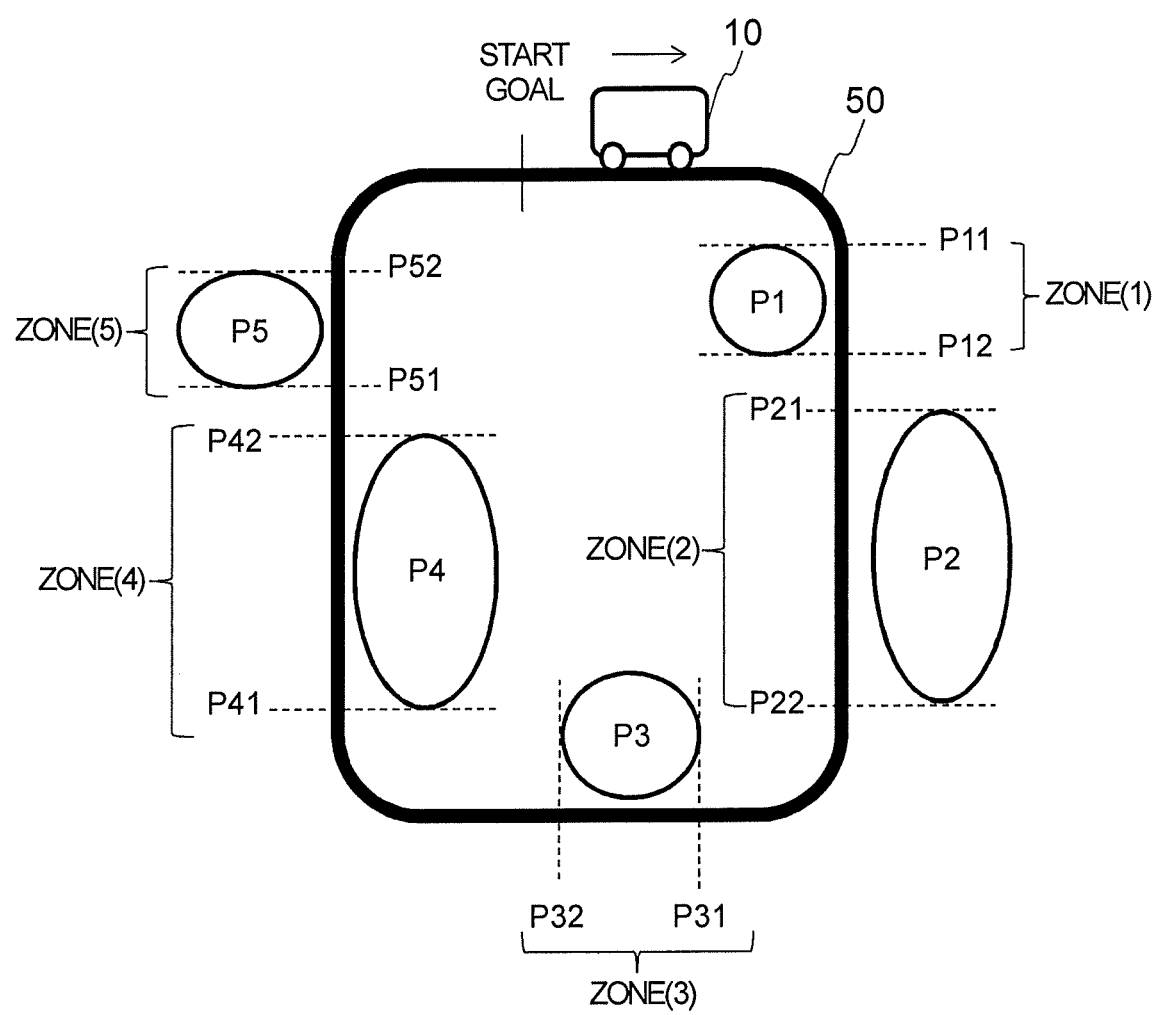
FIG. 2 shows one example of a traveling course (moving route) of a vehicle.

FIG. 2 shows one example of the traveling course (moving route) of the vehicle 10. In the example shown in FIG. 2, the traveling course 50 is in the form of a ring in a plane, and its start point (START) and end point (GOAL) of movement are located at the same point. The vehicle 10 travels clockwise around the traveling course 50. In this connection, the traveling course is not necessarily in the form of a ring, and the start point and the end point may be at different locations.

In FIG. 2, viewing objects P1 to P5 are illustrated as examples of one, or two or more viewing objects. The viewing object P1 can be seen better from the right side of the vehicle 10, while the vehicle 10 is passing an interval (which will be called "zone (1)") between point P11 and point P12. The viewing object P2 can be seen better from the left side of the vehicle 10, while the vehicle 10 is passing an interval (which will be called "zone (2)") between point P21 and point P22. The viewing object P3 can be seen better from the right side of the vehicle 10, while the vehicle 10 is passing an interval (which will be called "zone (3)") between point P31 and point P32. The viewing object P4 can be seen better from the right side of the vehicle 10, while the vehicle 10 is passing an interval (which will be called "zone (4)") between point P41 and point P42. The viewing object P5 can be seen better from the left side of the vehicle 10, while the vehicle 10 is passing an interval (which will be called "zone (5)") between point P51 and point P52. The vehicle 10 may move at a constant speed all the time, or may be decelerated or temporarily stopped in the zones (1) to (5).

Configuration of Terminal

Figure 3:
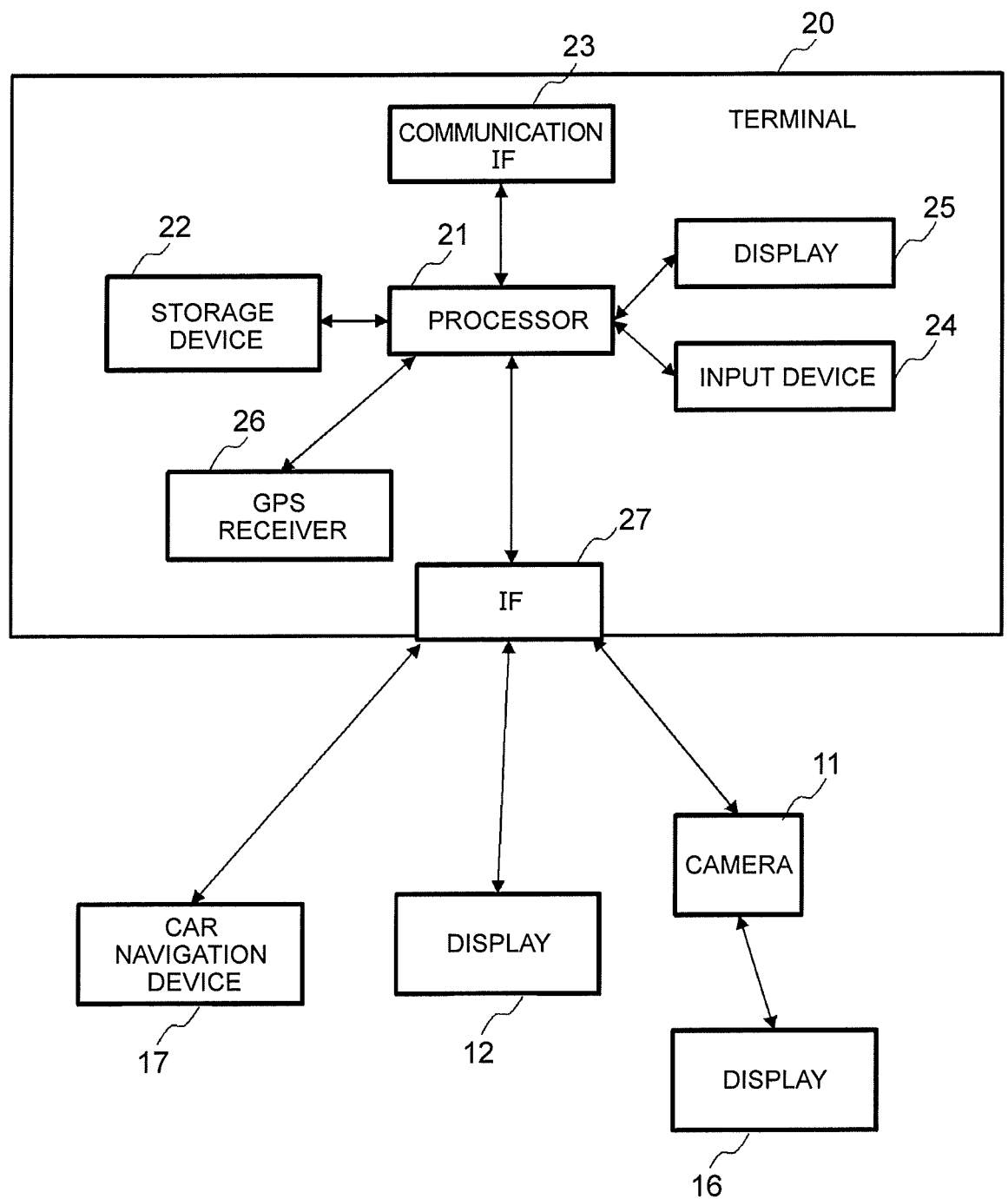
FIG. 3 shows an example of the configuration of a terminal.

FIG. 3 shows an example of the configuration of the vehicle-mounted terminal (terminal 20). The terminal 20 may be a terminal device installed on the vehicle 10, or may be a terminal device merely placed in the vehicle 10. The terminal 20 may be a smart device, such as a laptop personal computer, smartphone, or tablet terminal, or a portable terminal (communication terminal having portability), such as PDA (Personal Digital Assistant), or a wearable computer. In the first embodiment, it is assumed, as one example, that the terminal 20 is installed on the vehicle 10.

The terminal 20 includes a processor 21, storage device 22, communication interface (communication IF) 23, input device 24, display 25, and GPS (Global Positioning System) receiver 26.

The storage device 22 includes a main storage device and an auxiliary storage device. The main storage device is used as a storage area for programs and data, running area for programs, work area for programs, buffer area for communication data, and so forth. The main storage device is in the form of RAM (Random Access Memory), or a combination of RAM and ROM (Read-Only Memory). The auxiliary storage device is used as a storage area for data and programs. The auxiliary storage device includes a non-volatile storage medium, such as a hard disc, SSD (Solid State Drive), flash memory, or EEPROM (Electrically Erasable Programmable Read-Only Memory).

The communication IF 23 controls wireless communications according to a wireless communication system (such as LTE, 5G, wireless LAN (Wi-Fi)) supported by the terminal 20. When the terminal 20 is a fixed terminal, a network interface card may be used as the communication IF 23.

The input device 24 includes keys, buttons, pointing device, touch panel, or the like, and is used for entry of information. The display 25 is, for example, a liquid crystal display, and displays information and data. The GPS receiver 26 receives a signal from a GPS satellite, and calculates the position of the terminal 20. The position of the terminal 20 is used as the position of the vehicle 10.

The processor 21 is, for example, a central processing unit (CPU). The processor 21 performs a variety of processing, by executing various programs stored in the storage device 22.

The terminal 20 includes an interface circuit (IF) 27, and is connected to the camera 11, display 12, and car navigation device 17 (installed on the vehicle 10), via the IF 27. The processor 21 controls imaging parameters, the line of sight, the angle of view, etc. of the camera 11, according to operation of a GUI (Graphical User Interface) of the camera 11 using the input device 24 and the display 25. Also, the processor 21 receives information indicating the current position of the vehicle 10, and information indicating scheduled passage times of the zones (1) to (5) (schedules times at which the vehicle 10 passes the start point and end point of each zone), from the car navigation device 17. The information thus received is used for adjustment of the schedule.

Also, the processor 21 displays the information indicating the scheduled passage times of the zones (1) to (5), information indicating the time of preparation of food and drink served to the passengers 2, and information indicating the time of serving of the food and drink to the passengers 2. When the current time belongs to the food-and-drink preparation time or serving time, or zone passage time, the processor 21 may display these items of information on the display 12, in a special form that makes viewers (cook 3 and wait person 4) intuitively understand the information.

Configuration of Server

Figures 4, 5:
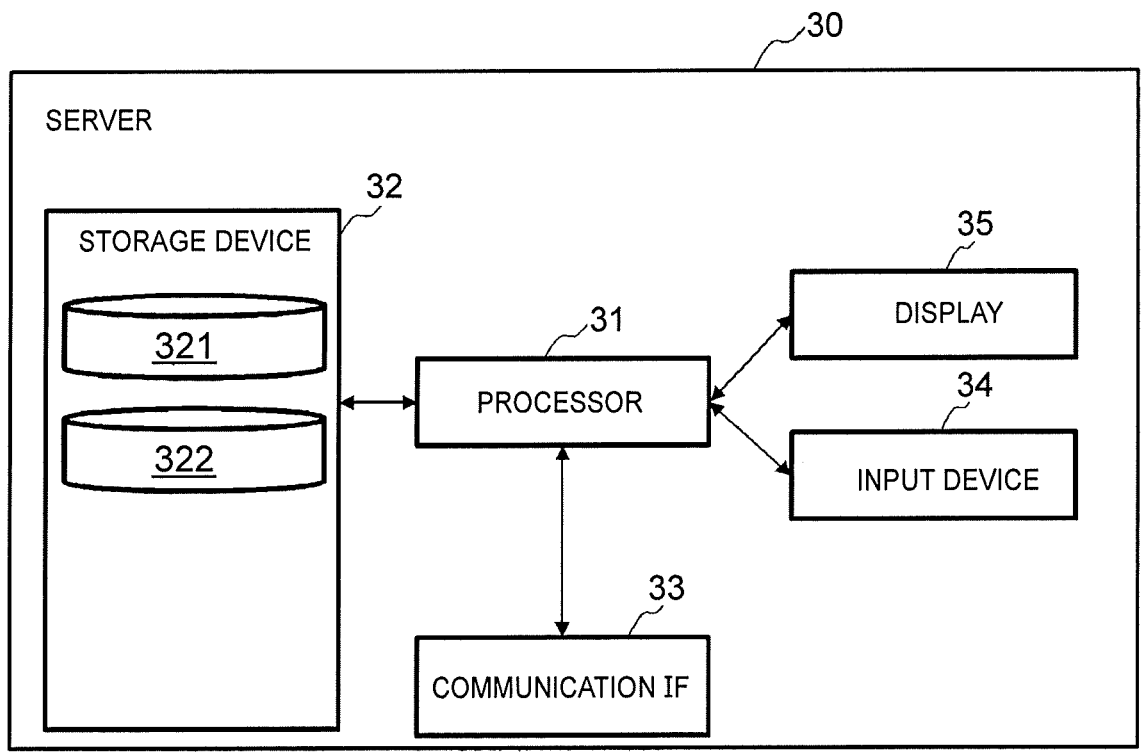
FIG. 4 shows an example of the configuration of a server.
FIG. 5 shows an example of a data structure of a table of moving route information.

FIG. 4 shows an example of the configuration of the server 30. The server 30 may be constructed by using a general-purpose information processing device, such as a personal computer (PC), or workstation, or a dedicated information processing device, such as a server machine. The server 30 includes a processor 31, storage device 32, communication interface (communication IF) 33, input device 34, and display 35. The storage device 32 stores a table 321 of moving route information, and a table 322 of food-and-drink information. The processor 31 is one example of the controller.

Those similar to the processor 21, storage device 22, input device 24 and display 25 as illustrated above may be used as the processor 31, storage device 32, input device 34, and display 35, respectively. However, those that are different in performance from the ones used in the terminal 20 are used, depending on differences in the use application or the purpose of use.

The communication IF 33 performs communication processing. As the communication IF 33, a network interface card (NIC) may be used, for example. The communication IF 33 sends and receives data to and from the terminal 20, via the network 1. The processor 31 operates the server 30 as the information processing device that controls the food/drink preparation time and serving time in the vehicle 10, by executing various programs stored in the storage device 32.

As the processor 21 or processor 31, two or more CPUs or a multi-core CPU may be used. At least a part of the processing performed by the CPU may be carried out by a processor, such as DSP (Digital Signal Processor) or GPU (Graphical Processing Unit), other than the CPU, or a dedicated or general-purpose integrated circuit, such as ASIC (Application Specific Integrated Circuit) or FPGA (Field Programmable Gate Array), or a combination of such processor and integrated circuit. The combination is called, for example, a microcontroller (MCU), SoC (System-on-a-chip), system LSI, or chipset. A part of the processing performed by the processor 31 may be performed by the processor 21. For example, the processing performed in the server 30, which will be described later, may be performed in the terminal 20. The server 30 is one example of the information processing device.

Moving Route Information

FIG. 5 shows an example of a data structure of the table 321 of moving route information. In FIG. 5, the table 321 stores information indicating zones where passengers see viewing objects, on a route from a start point (point of departure) to an end point (destination) of movement of the vehicle 10, information indicating zone passage times, and information indicating relevance of the zones and the food and drink.

In the example shown in FIG. 5, the vehicle 10 that travels along the traveling course 50 is scheduled to start from the point of departure (start point) at 19:00, and arrive at the destination (end point) at 20:30. Each of the above-indicated zones included in the traveling course 50 is defined by the start point of the zone and the end point of the zone, and the zone is associated with a viewing object ID as an identifier of a viewing object. The viewing object ID may be used as a zone ID. Also, a passage time of the zone start point (at which the vehicle 10 passes the start point of the zone) and a passage time of the zone end point (at which the vehicle 10 passes the end point of the zone) are calculated, on the assumption that the vehicle 10 moves at a predetermined speed, and stored in the table 321. The passage time of the zone start point and the passage time of the zone end point are both scheduled times.

The information indicating relevance with food and drink serves to link attributes or image possessed by a viewing object, with attributes or image possessed by food or drink. In the first embodiment, a food/drink ID as an identifier of each item of food and drink, which is associated with the viewing object ID, is stored. For example, when the viewing object has an image of "sea", the "food or drink" is seafood. The viewing object and the food or drink may be associated with each other with tag information. The information indicating relevance with the food and drink is optional.

The viewing object ID, zone start point, zone end point, and information indicating relevance with food and drink, among the items of information stored in the table 321, are read from the storage device 32 of the server 30, or a viewing object management database (DB), which is stored in a certain storage device other than the storage device 32. The viewing object management DB manages zones (each defined by the zone start point and the zone end point) corresponding to a plurality of viewing objects, and food/drink IDs associated with the viewing objects.

Food-and-Drink Information

FIG. 6 shows an example of a data structure of the food-and-drink information table 322. The table 322 stores identifiers (food/drink IDs) of a plurality of foods and drinks served to the passengers 2, during movement from the start point to the end point of the traveling course 50. The table 322 also stores the order of serving of foods and drinks, required time for food/drink preparation, preparation times, required time for serving, serving times, and information (interval information) indicating an interval to the next tray service, in association with each of the food/drink IDs.

The required time for food/drink preparation indicates a required length of time it takes from the start of preparation of a food or drink, to the time when the food or drink is ready for serving to the passengers 2. The preparation times indicate a scheduled time zone in which the cook 3 prepares food or drink, namely, a preparation start time and a preparation end time. Also, the required time for serving indicates a required length of time it takes the wait person 4 to serve food or drink (including the steps of carrying the food or drink to the table 14, placing it on the table 14, and explaining the dish, for example), until the passengers are ready to start eating or drinking the food or drink. The serving times include a food/drink serving start time and a food/drink serving end time. The interval information indicates time (interval) provided between the previous dish to the next dish. The interval to the next tray service is determined in view of the time at which each passenger finishes the food or drink, and subsequent break time between dishes.

In the first embodiment, the serving times are calculated based on information indicating the passage time of each zone, so that the passengers 2 are not disturbed when seeing the viewing object, due to serving of the food or drink. The passengers 2, who are looking at the viewing object, may feel disturbed when the wait person 4 places the food or drink on the table 14, pours the drink, or explains the dish. Thus, the foods and drinks are served in such timing that the passengers 2 do not feel disturbed. For example, a food/drink serving period (period of time from the serving start time to the end time) is determined so as not to overlap the passage times of the zones (1) to (5). The passage time of the zone is one example of the "time provided for seeing the viewing object".

The food/drink ID, required time for preparation, required time for serving, and interval information, among the items of information stored in the table 322, are read from a food-and-drink management database (DB), which is stored in the storage device 32 of the server 30, or a certain storage device other than the storage device 32. The food-and-drink management DB stores the required time for preparation and required time for serving associated with the food/drink ID, and the interval information.

Example of Processing

Figure 7:
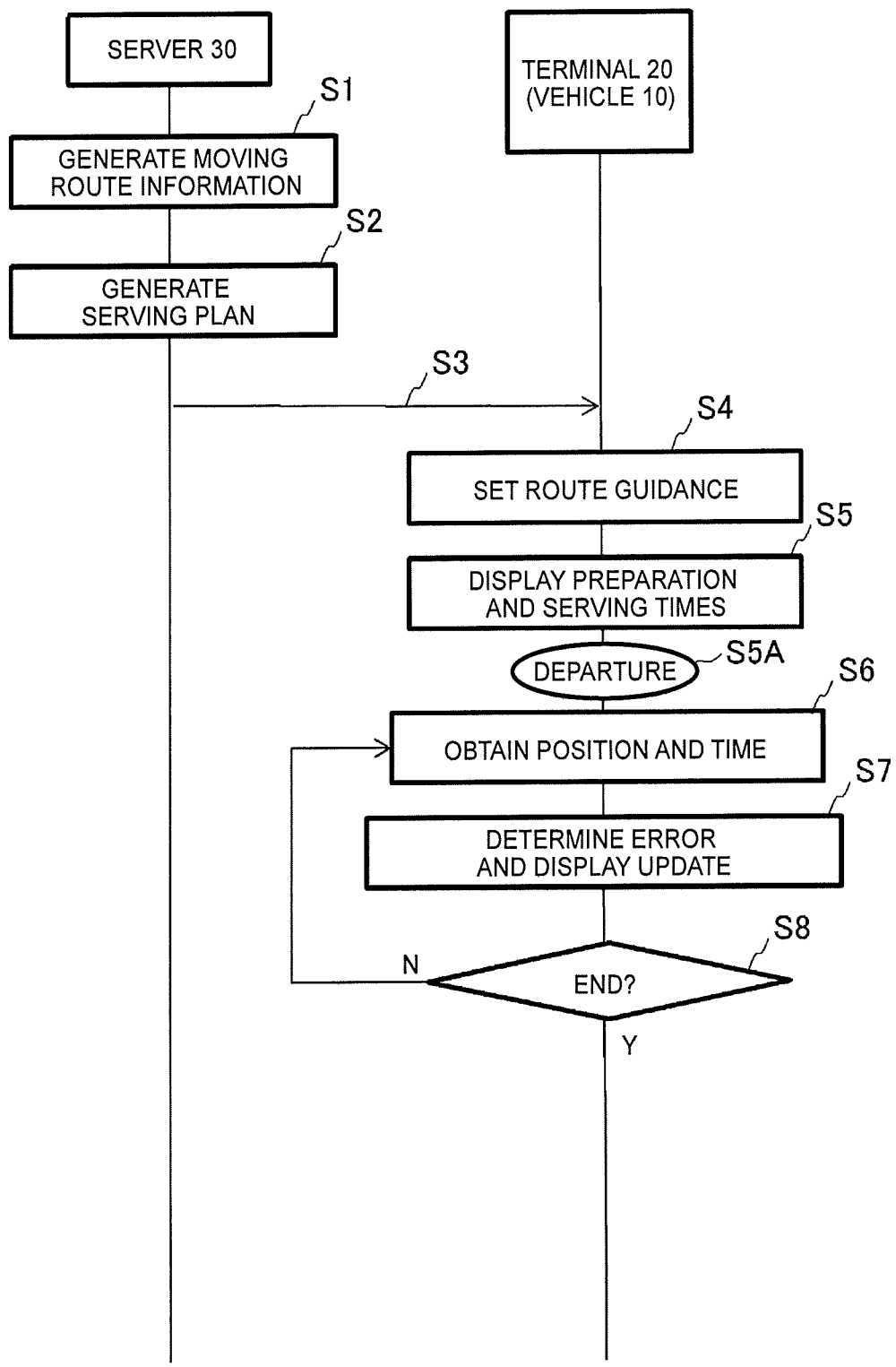
FIG. 7 is a flowchart illustrating an example of processing performed by the computer system including the server and the terminal.

FIG. 7 is a flowchart illustrating an example of processing performed by a computer system including the server 30 and the terminal 20. The processor 31 of the server 30 performs a process of generating moving route information (step S1).

Figure 8:
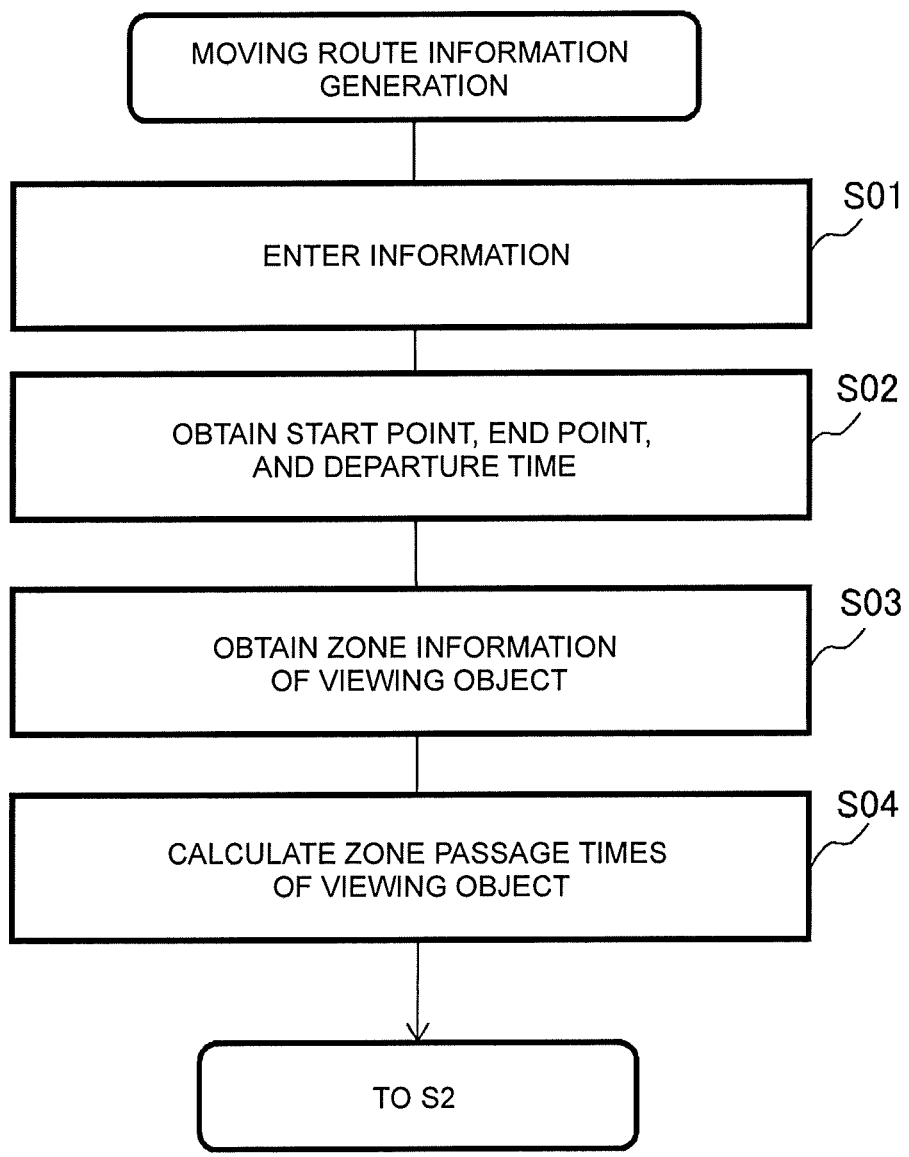
FIG. 8 is a flowchart illustrating one example of a process of generating the moving route information.

FIG. 8 is a flowchart illustrating one example of the process of generating the moving route information. In step S01, information is entered into the server 30. An operator enters information indicating the start point and end point of movement, and information indicating the time of departure from the start point of movement, into the server 30, using the input device 34. The operator also enters information (viewing object ID) that designates one or more viewing objects to be presented to the passengers 2 during movement from the start point to end point of movement. When there are two or more viewing objects, the order of viewing is designated.

In the first embodiment, information indicating that the viewing objects P1 to P5 are to be viewed in the order of P1→P2→P3→P4→P5 is entered. Also, the operator enters information indicating the moving speed of the vehicle 10. The moving speed may be information indicating the average speed over the entire length of the moving route, or may be information indicating the moving speed in the zones (1) to (5) corresponding to the viewing objects, and the moving speed in zones other than the zones (1) to (5). The moving speed may be designated for each zone.

In step S02, the processor 31 stores the positions of the start point and end point of the traveling course 50, and the time of departure from the start point, into the table 321. In step S03, the processor 31 reads the zone start point and end point corresponding to each of the designated viewing object IDs (the viewing object IDs of the viewing objects P1 to P5), from the viewing object management DB, and stores them in the table 321.

In step S04, the processor 31 calculates the passage times (start-point passage time and end-point passage time) of each of the zones (1) to (5) corresponding to the viewing objects P1 to P5. For example, the start point and end point of movement, and a distance between the start point and end point of each zone are stored in advance in the storage device 32. The processor 31 calculates the passage times of each zone, in the case where the vehicle 10 starts from the start point at the time of departure, and reaches the end point, via the zones (1) to (5) of the viewing objects, using the entered information indicating the moving speed of the vehicle 10. Through this calculation, the time of arrival at the end point of movement is calculated. The processor 31 stores the results of calculation of the passage times of the start points and the passage times of the end points corresponding to the viewing objects P1 to P5, and the time of arrival at the end point of movement, in the table 321. In this manner, moving route information (information indicating the traveling course 50) is generated in the table 321.

As is understood from the above process, the operator enters the information indicating the start point and end point of movement, information indicating the time of departure from the start point, information indicating one or more viewing objects (zones) (information indicating the start and end points of each zone), information designating the order of passage when there are two or more viewing objects, and information designating the moving speed of the vehicle 10. As a result, the processor 31 automatically generates moving route information. It is possible to adjust the time of arrival at each point that provides the end point of each zone, by changing the designated moving speed.

Figure 9:
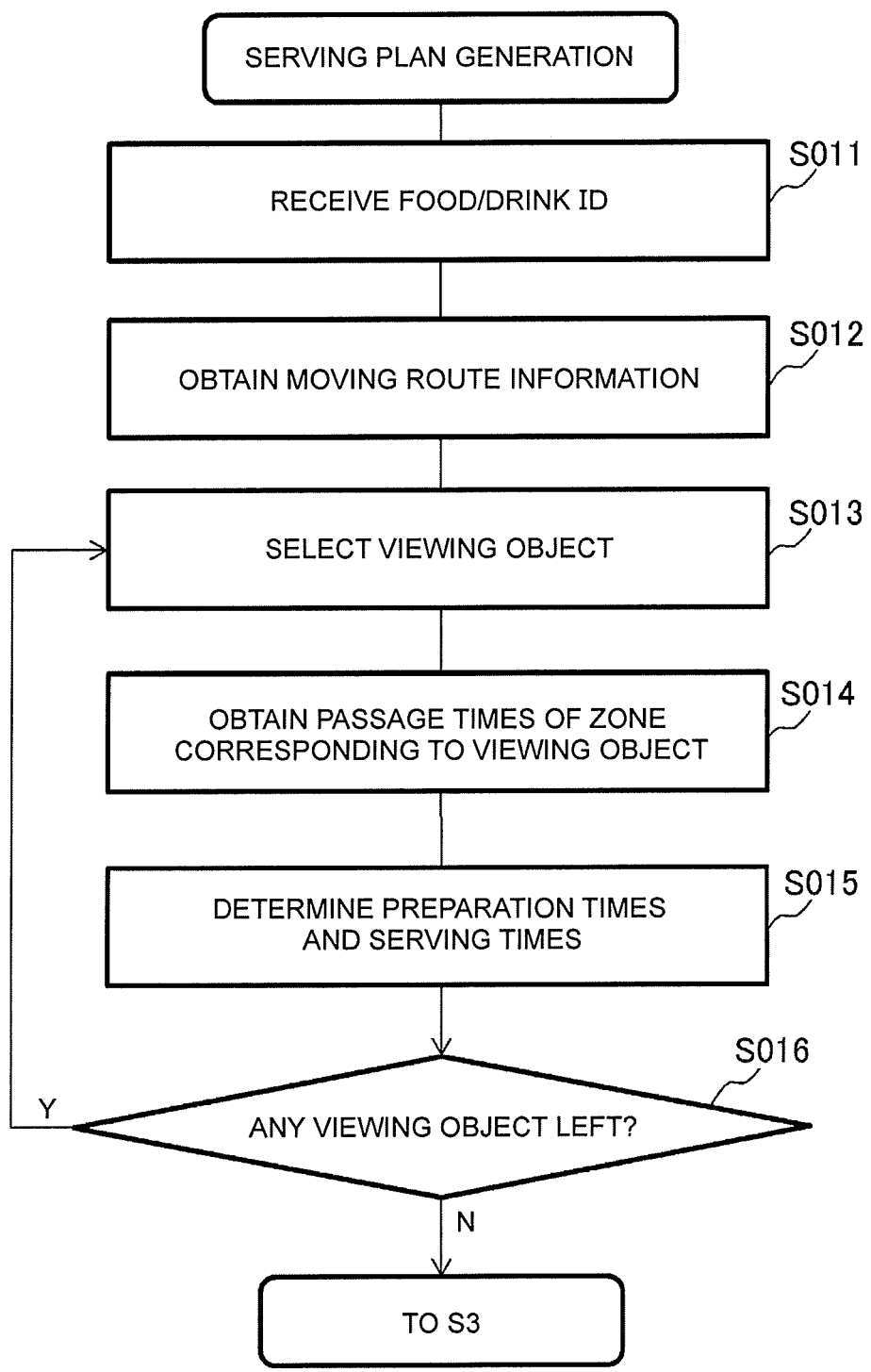
FIG. 9 is a flowchart illustrating an example of a process of generating a serving plan.

Referring back to FIG. 7, the processor 31 performs a serving plan generating process (S2). FIG. 9 is a flowchart illustrating one example of the serving plan generating process (S2). In step S011, the processor 31 receives the food/drink ID. The operator of the server 30 enters the food/drink IDs of a plurality of foods and drinks served to the passengers in the vehicle 10, in the order of serving, using the input device 34. The processor 31 reads the required time for preparation, required time for serving, and interval information, which correspond to each of the food/drink IDs, from the food-and-drink management DB, and stores them in the table 322.

The processor 31 calls up the table 321 of moving route information (S012). The processor 31 specifies one viewing object (record), from the table 321, according to the order of viewing (S013), and obtains the passage times of the zone start point and zone end point in the specified record (i.e., the passage times of the zone corresponding to the viewing object) (S014).

In step S015, the processor 31 determines the food/drink preparation times and the serving times. For example, the processor 31 determines the serving start time and serving end time, using the passage time of the start point of the zone obtained in step S014, and the required time for serving obtained from the table 322, so that the tray service ends at a clock time that is ahead of the passage time of the start point by a predetermined length of time (which will be called "time T1"), or at a clock time ahead of the above clock time.

Time T1 is provided for allowing the passengers 2 to enjoy looking at the food or drink (dish), or taste the first bite or sip of the food or drink, in other words, allowing the passengers to concentrate on the dish. Also, the processor 31 determines the preparation times (preparation start and end times), using the serving start time and the preparation time obtained from the table 322, so that the preparation ends by the serving start time. The processor 31 stores the calculated serving times and preparation times, in the table 322.

In step S016, the processor 31 determines whether any viewing object in the table 321 has not been subjected to processing. When the processor 31 determines that one or more viewing objects have not been processed, the control returns to step S013, and the processor 31 selects the next viewing object. On the other hand, when no viewing object remains, the process of FIG. 9 ends.

Figure 10:
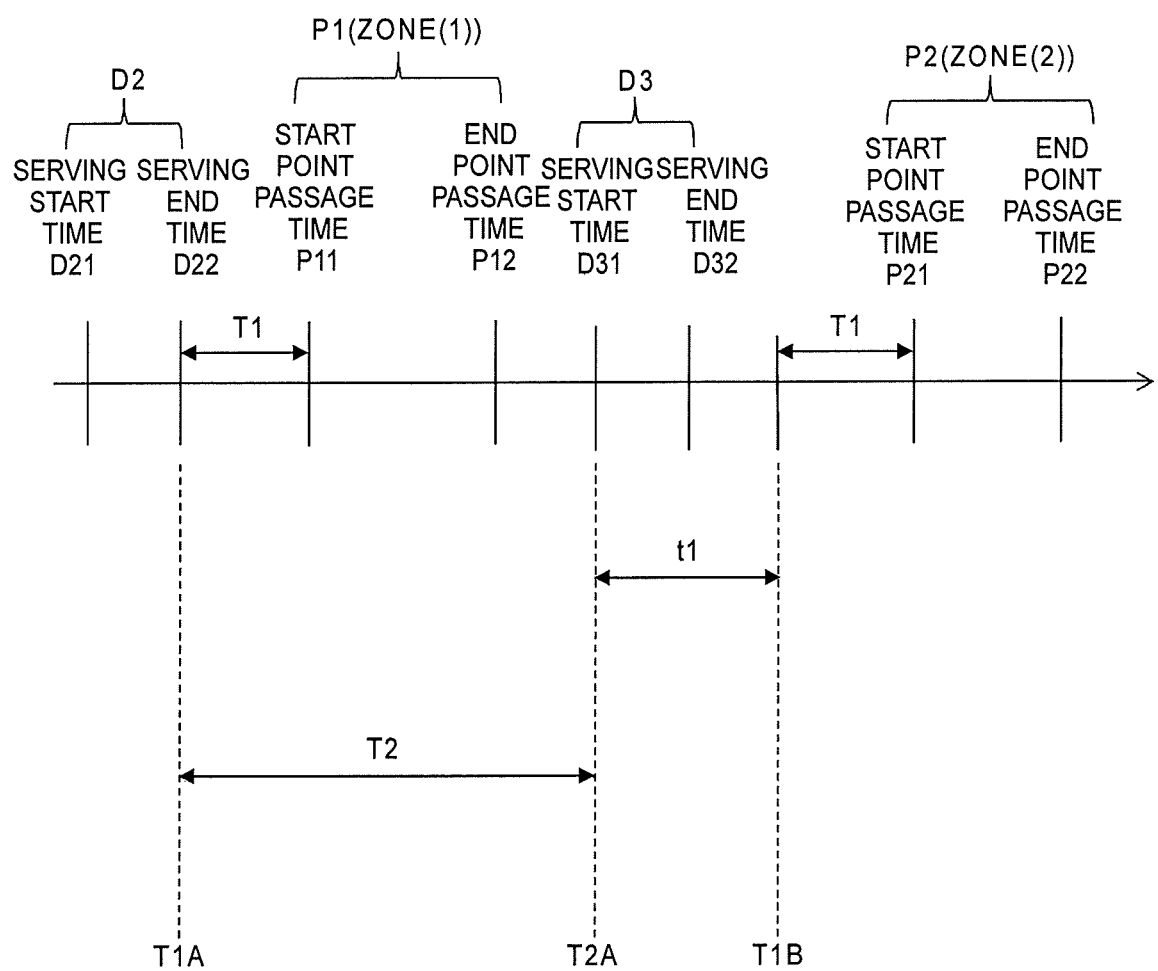
FIG. 10 is a view useful for describing the relationship between passage times of zones corresponding to viewing objects, and serving times.
Figure 11:
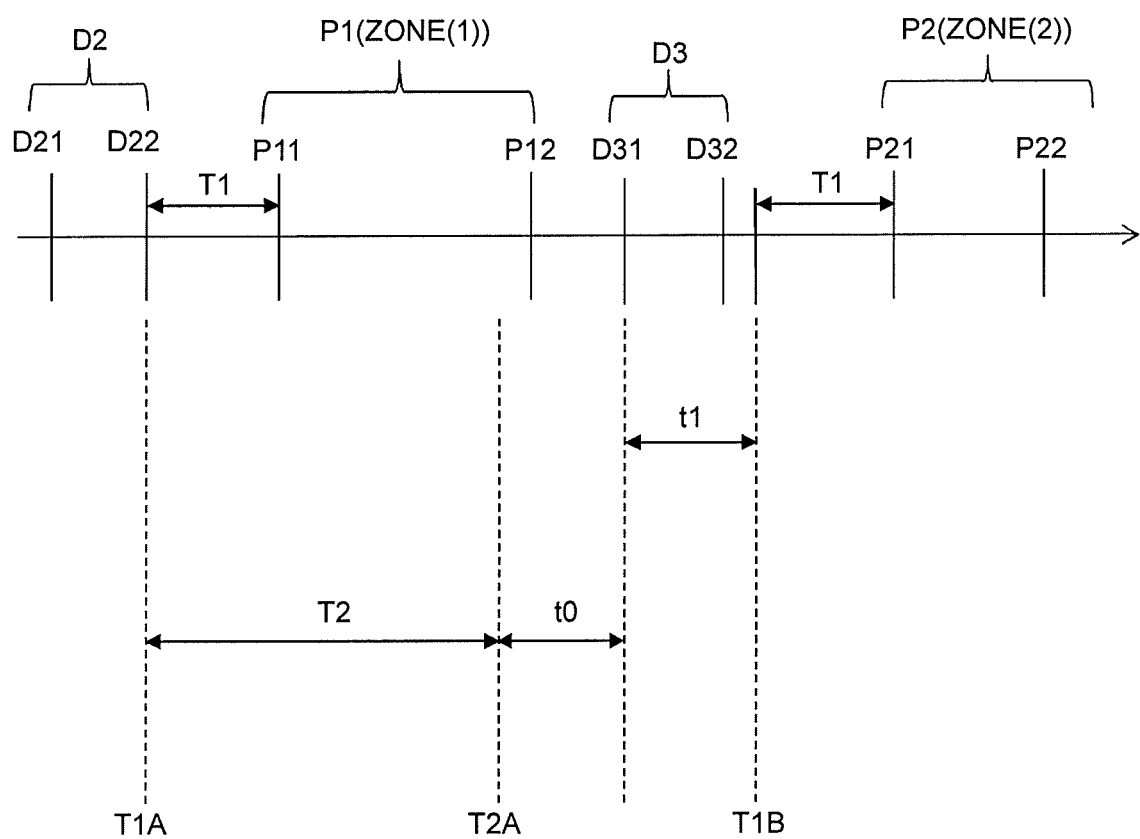
FIG. 11 is a view useful for describing the relationship between passage times of zones corresponding to viewing objects, and serving times.

FIG. 10 and FIG. 11 are useful for describing the relationship between the passage times of the zones corresponding to the viewing objects, and the serving times. As one example, the relationship between the passage times (the passage time of the start point P11 and the passage time of the end point P12) of the zone (1) corresponding to the viewing object P1, and the serving times (the serving start time D21 and the serving end time D22) of the food/drink D2, is shown.

Also, the relationship between the passage times (the passage time of the start point P21 and the passage time of the end point P22) of the zone (2) corresponding to the viewing object P2, and the serving times (the serving start time D31 and the serving end time D32) of the food/drink D3, is shown.

In the example shown in FIG. 10, the serving end time D22 of the food/drink D2 is set to a clock time (denoted as T1A) that is ahead of the passage time of the start point P11 of the zone (1) corresponding to the viewing object P1 by time T1. In other words, the serving times are set, such that the passage time of the start point P11 corresponding to the viewing object P1 comes when time T1 elapses from the serving end time D22 of the food/drink D2. The food/drink D2 is one example of the "first food or drink", and coming of the serving end time D22 means the end of serving of the food/drink D2 corresponding to the first food or drink. The time T1 is one example of the "predetermined time". The passage times (P11 and P12) of the zone (1) are one example of the time provided for seeing the viewing object P1.

Also, in FIG. 10, the passage times (the passage time of the start point P21 and the passage time of the end point P22) of the zone (2) corresponding to the viewing object P2 are indicated. In this example, the processor 31 sets the serving start time D31 of the food/drink D3, according to an interval (denoted as time T2) between the end of serving of the food/drink D2 and the start of serving of the food/drink D3 next to the food/drink D2, such that the end time (denoted as T2A) of time T2 coincides with the serving start time D31 of the food/drink D3. In the example shown in FIG. 10, the serving end time D32 is located at a position earlier than a point in time (denoted as T1B) that is ahead of the passage time of the start point P21 of the zone (2) by time T1 (namely, serving is completed at a point in time that is earlier than the passage time of the start point P21 by more than time T1).

Within a period of time (denoted as "t1") between the end time T2A of time T2 indicating the interval between serving of the food/drink D2 and that of the food/drink D3, and the above-indicated time T1B, the serving times (serving start time D31 and serving end time D32) of the food/drink D3 may be moved. The movement may be carried out through manual operation by the user, or may be carried out by the processor 31, according to a predetermined algorithm.

In the example shown in FIG. 10, the end time T2A of time T2 is later than the passage time of the end point P12 of the zone (1). On the other hand, if the end time T2A of time T2 is set to the serving start time D31 of the next food/drink D3 (second food or drink), the serving start time D31 would become earlier than the passage time of the end point P12 of the zone corresponding to the viewing object P1 (serving is started while the passengers are seeing the viewing object P1), in the example shown in FIG. 11. In this case, the processor 31 performs processing as follows.

As shown in FIG. 11, the processor 31 adds a predetermined length of offset time t0 to time T2, so that the serving start time D31 of the next food/drink D3 becomes later than time P12. When the start time D31 is still earlier than time P12 even after the offset time t0 is added once, the addition of the offset time t0 is repeatedly done twice, or three times, for example, until the start time D31 becomes later than time P12.

The addition of the offset time t0 is done as far as the serving end time D32 does not become later than a point in time (time T1B) that is ahead of time P21 of zone (2) by time T1. Also, when the serving end time D32 becomes later than time T1B if the offset time t0 is added, the processor 31 determines the serving times such that the serving end time D32 coincides with time T1B. At this time, the serving start time D31 is permitted to be located ahead of time P12. Thus, time T1 provided for enjoying the next food/drink D3 is secured, even if the zone (1) of the viewing object P1 has not finished.

Thus, in the first embodiment, when the time (serving start time D31) to serve the second food or drink (food/drink D3) served next to the first food or drink (food/drink D2) comes earlier than the end (passage time of the end point P12) of the time provided for seeing the viewing object (P1), the processor 31 adjusts the time (serving start time D31) to serve the second food or drink (food/drink D3) so that it comes after the end of the time provided for seeing the viewing object (P1).

Figure 12:
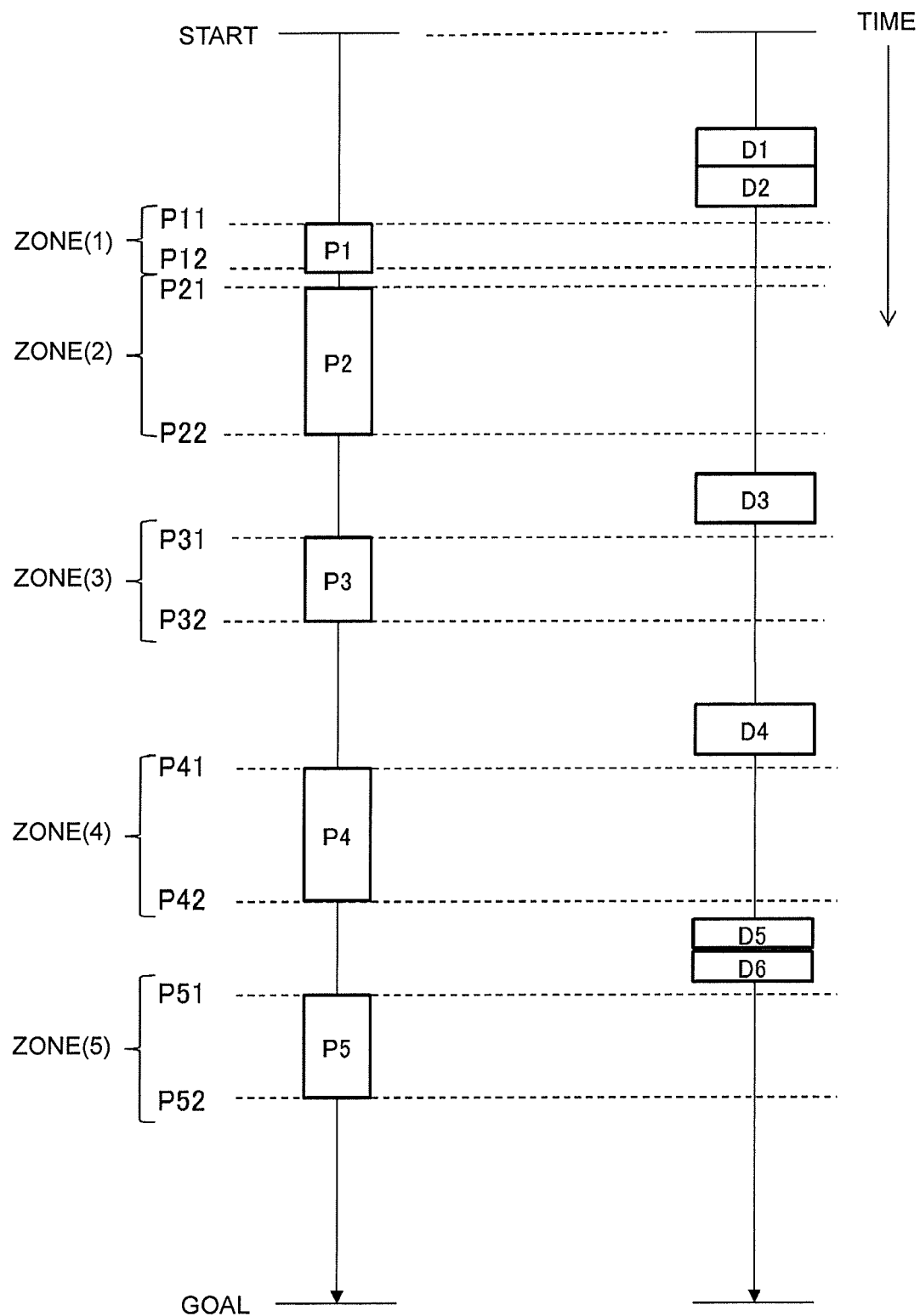
FIG. 12 shows one example of the relationship between viewing times of viewing objects seen from a vehicle moving along a traveling course, and the timing of serving of food and drink.

FIG. 12 shows one example of the relationship between viewing times of the viewing objects P1 to P5 seen from the vehicle 10 that travels along the traveling course 50, and the timing of serving of the foods/drinks D1 to D6. In FIG. 12, the food/drink D1 is a drink, and the food/drink D2 is an appetizer, while the interval information associated with the food/drink D1 indicates 0 (this food/drink can be served at the same time as the next food/drink); therefore, the serving times for the food/drink D1 and food/drink D2 are set, so that serving of the food/drink D1 and food/drink D2 is completed before the vehicle 10 enters the zone (1).

Also, the serving time of the food/drink D3 (e.g., a dish of fish) is set so that the food/drink D3 is served after the vehicle 10 passes the zones (1) and (2), based on the interval information of the food/drink D2. Also, the serving time of the food/drink D4 (e.g., a dish of meat) is set so that the food/drink D4 is served after the vehicle 10 passes the zone (3), based on the interval information of the food/drink D3.

Then, the serving times of the food/drink D5 and food/drink D6 (e.g., a dessert and a drink) are set so that the food/drink D5 and food/drink D6 are served successively before the vehicle 10 passes the zone (5), since the interval information of the food/drink D5 indicates 0 (zero). As described above, the serving times (serving plan) of the foods/drinks D1 to D6 are set so as not to overlap the viewing times of the viewing objects P1 to P5. The processor 31 stores the information of the serving plan in the table 322, as a part of the food-and-drink information.

Referring back to FIG. 7, the server 30 sends the moving route information stored in the table 321, and the food-and-drink information stored in the table 322, to the terminal 20 of the vehicle 10 (S3).

In the terminal 20, the processor 21 stores the moving route information and food-and-drink information in the storage device 22. An occupant of the vehicle 10 (e.g., a driver of the vehicle 10) operates the terminal 20 using the input device 24, before the departure time, so as to cause the processor 21 to display the moving route information on the display 25. Referring to the moving route information, the occupant performs settings of route guidance on the car navigation device 17, so as to set the position of the end point as the destination, and set the zone start points and zone end points of the viewing objects P1 to P5 as transit points.

As a result, the car navigation device 17 generates information indicating the current position, and the scheduled time of arrival at the next scheduled place of arrival (transit point or destination), which are received by the terminal 20. The information of the current position and the scheduled arrival time is displayed on a display included in the car navigation device 17. Also, the processor 21 can display the information on the display 25 and the display 12.

The processor 21 displays the content of the food-and-drink information received from the server 30, on the display 12 located in the kitchen space. Thus, the cook 3 and wait person 4 can check the preparation times and serving times for the foods/drinks D1 to D6 displayed on the display 12.

Then, the driver moves the vehicle 10 to the start position of movement, and lets the passengers 2 get on the vehicle 10, and the vehicle 10 starts at the departure time (S5A). The current position, information indicating the next scheduled place of arrival, and the scheduled time of arrival at this place are generated from the car navigation device 17, and supplied to the processor 21 of the terminal 20 (S6).

Examples of the scheduled place of arrival include the start points of the zones, end points of the zones, and the point of destination.

In step S7, the processor 21 performs error determination and update display. Namely, when the processor 21 obtains the scheduled time of arrival at the next scheduled place of arrival, it determines whether a difference from the passage time of a point corresponding to the next scheduled place of arrival, which is included in the moving route information, is within a predetermined range (e.g., ±several minutes) of error. When the difference is larger than the range of error, the processor 21 re-calculates the preparation times and serving times in accordance with the scheduled time of arrival, and displays the updated preparation times and serving times on the display 12. With this arrangement, the cook 3 and the wait person 4 can advance or delay the preparation start time or serving start time, according to the updated preparation times and serving times. Thus, the food and drink can be served in accordance with the actual movement of the vehicle 10. In the meantime, the wait person 4 watches the passengers 2 while they are eating or drinking, and clears away the dishes at appropriate times when they finish eating or drinking.

In step S8, the processor 21 makes an end determination. For example, the processor 21 determines whether it has received information indicating arrival at the final destination (the end of the route guidance), from the car navigation device 17. When the processor 21 determines that it has not received the information indicating the end of the route guidance, it returns to step S6. On the other hand, when the processor 21 determines that it has received the information indicating the end, it performs a predetermined termination process (for example, finishing display of the food-and-drink information on the display 12). The determination of step S8 may also be made by determining whether the current time has passed the serving time of the last food/drink D6, for example.

The tasks of steps S1 and S2 may be performed in the terminal 20. Also, the current position and the scheduled time of arrival at the next scheduled place of arrival may be obtained from a device other than the car navigation device 17, or may be calculated by the terminal 20 itself. Also, the processor 21 may display the information indicating the current position of the vehicle 10, on the display 12.

Effects of First Embodiment

According to the first embodiment, the server 30 generates the moving route information and the food-and-drink information, and supplies (outputs) them to the terminal 20 of the vehicle 10. The vehicle 10 travels along the traveling course 50, such that the passengers 2 see the viewing objects P1 to P5. The serving times of the foods/drinks D1 to D6 are set, so that the foods/drinks D1 to D6 will not be served during times provided for viewing of these objects.

The passengers 2 can directly see the viewing objects P1 to P5 through the window 15, or watch real-time images of the viewing objects at angles different from angles by which the objects are seen through the window 15, or enlarged real-time images of the viewing objects, by referring to the display 16. On the other hand, the passengers 2 can be served with the foods/drinks D1 to D6, in such timing that the passengers 2 are not disturbed when seeing the viewing objects P1 to P5. Namely, the foods/drinks D1 to D6 are served at appropriate times, to the passengers 2 who see the viewing objects P1 to P5. Thus, the passengers 2 can enjoy both viewing of objects, and eating and drinking. According to the first embodiment, it is possible to provide service that cannot be provided at fixed eating and drinking places.

Also, the serving end time is set, so that serving is completed before a point in time that is ahead of the passage time of the start point of the viewing zone by time T1. Thus, the passengers 2 can enjoy the served dishes with the eyes, or check the taste, during the time T1. In other words, the passenger's interest in the dishes is prevented from being reduced due to proceeding of the vehicle to the zones of the viewing objects.

Second Embodiment

Next, the second embodiment will be described. The configuration of the second embodiment includes the same or similar portions as those of the first embodiment. Thus, differences between these embodiments will be mainly described, and the same or similar portions will not be described.

In the first embodiment, the information processing device (server 30) adjusts the serving times and preparation times of a plurality of foods and drinks, in accordance with the information on the traveling course 50 (moving route) of the vehicle 10. In the second embodiment, the information processing device (server 30) that determines the moving route of the vehicle 10, in accordance with the serving plan generated, will be described.

Figure 13:
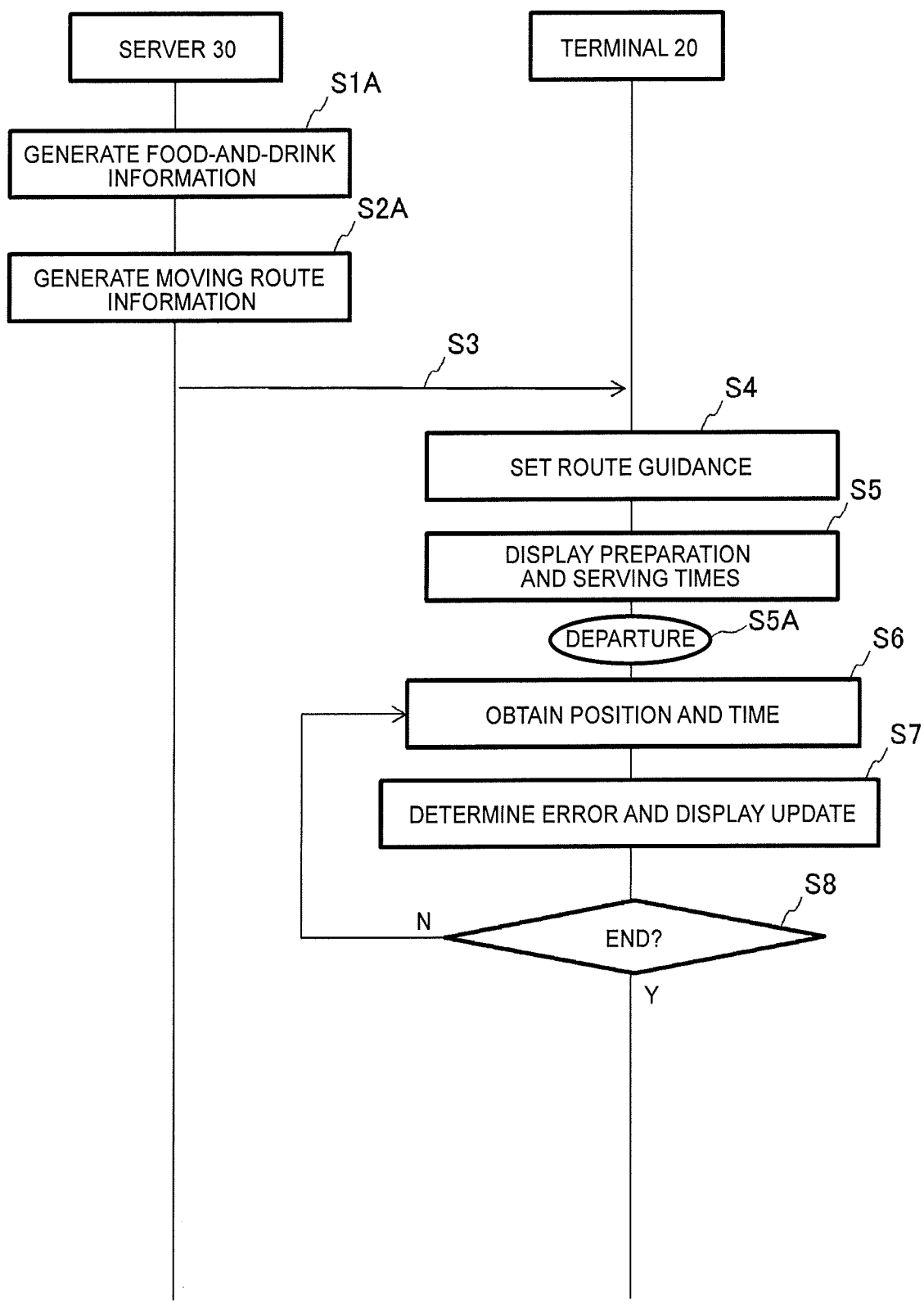
FIG. 13 is a flowchart illustrating an example of processing according to a second embodiment.

FIG. 13 shows an example of processing according to the second embodiment. In step S1A, the processor 31 of the server 30 generates the table 322 of food-and-drink information, according to operation of the operator. For example, the processor 31 displays the required preparation time and required serving time, for each of the foods/drinks D1 to D6, on the display 35, and inputs the preparation times, serving times, and interval information, in view of the required preparation time and required serving time. The processor 31 stores the preparation times, serving times, and interval information for the foods/drinks D1 to D6, in the table 322, to generate food-and-drink information.

In step S1A, the processor 31 may display information indicating a plurality of candidates of foods and drinks, and the operator may select a plurality of foods and drinks (e.g., D1 to D6) to be served to the passengers 2, from among the candidates. Then, the processor 31 may perform the above processing on the foods and drinks D1 to D6.

Figure 14:
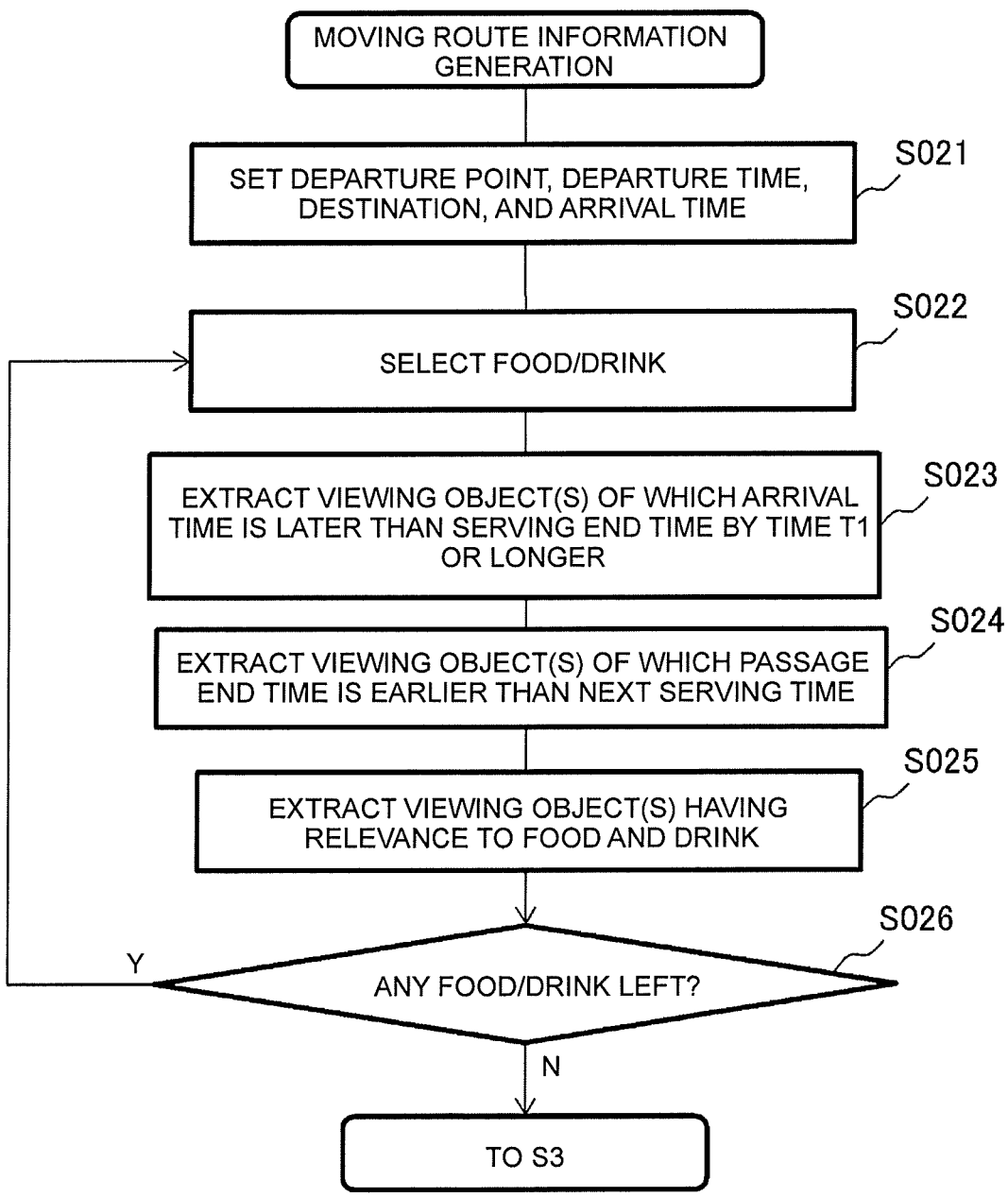
FIG. 14 is a flowchart illustrating one example of a process of generating moving route information according to the second embodiment.

In step S2A, the processor 31 performs a process of generating moving route information. FIG. 14 is a flowchart illustrating one example of the process of generating the moving route information according to the second embodiment.

In step S021, the processor 31 sets information indicating the point of departure of the vehicle 10, destination, time of departure from the point of departure, and time of arrival at the destination. For the setting, the operator enters these items of information into the server 30, and the processor 31 receives the information thus entered.

In step S022, the processor 31 obtains the food-and-drink information of the table 322, and selects a record of the first food/drink D1. At this time, when the interval information in the record of the food/drink D1 indicates 0 (indicating no interval required), the processor 31 further selects a record of the next food/drink (food/drink D2). Thus, when the interval information indicates 0, operation to further select the next record is repeated.

Regarding the food or drink (food/drink D6) served last, the interval information indicates 0, but there is no record of the next food/drink. In this case, a flag indicating that it is the last food/drink is set, and the processor 31 performs step S023 and subsequent steps.

In step S023, the processor 31 extracts a viewing object or objects at which the vehicle 10 will arrive at a point in time at which time T1 or a longer time elapses from the serving end time. Namely, the processor 31 extracts a record of each of the viewing objects of which the time of arrival at the zone start point from the current position is located at the point in time at which time T1 or a longer time elapses from the serving end time of the food or drink.

Any known method may be adopted as a method of route searching and calculation of the arrival time. For example, a search for a route from the current position to the start point of the zone is conducted, and the arrival time in the case where the vehicle travels along the route thus found at a given speed is calculated. When two or more foods and drinks are selected in step S022, the serving end time of the food/drink served last, among the two or more foods and drinks, is used. In the above example, the time of arrival at one of the start point and the end point (closer to the current position), which is earlier than that at the other point, is used for comparison with the serving end time. Namely, the vehicle is allowed to travel in the reverse direction through the zone of the viewing object. However, when there is any reason for limiting movement of the vehicle through the zone to that in the forward direction, only the start point is used for comparison.

In step S024, the processor 31 extracts a viewing object or objects of which the passage end time (in the forward direction of start to end or the reverse direction of end to start) of the zone corresponding to the viewing object is earlier than the serving start time of the next food/drink (the zone ends before the lapse of time T2), from among the viewing objects extracted in step S023.

In step S025, the processor 31 extracts a viewing object or objects having correlation with food and drink. Namely, the viewing objects, of each of which the record includes the food/drink ID of the food or drink selected in step S022, or tag information given to the food or drink, are extracted. Thus, the viewing objects that match the foods/drinks in terms of images or attributes are extracted.

When only one viewing object is extracted in step S023, steps S024 and S025 are skipped. When only one viewing object is extracted in step S024, step S025 is skipped. The order of steps S023, S024, S025 may be changed. The task of step S025 is optional, and may be omitted. Also, when two or more viewing objects remain in step S025, the processor 31 adopts one viewing object, according to a predetermined rule. For example, the processor 31 adopts the viewing object in the zone at which the vehicle arrives earliest.

In step S026, the processor 31 determines whether any record of food/drink that has not been processed still remains in the food-and-drink information. This determination can be made by determining whether the flag indicating the last food/drink as described above in step S022 is established (set). When the processor 31 determines that any record remains, it returns to step S022, and selects the next food/drink. On the other hand, when the processor 31 determines that no record remains, the process of FIG. 14 ends.

The information (viewing object ID, zone start point, zone end point, passage time of the start point, passage time of the end point, and information on relevance with the food and drink) associated with each viewing object and obtained as a result of step S025 is stored in the table 321. Steps S023 to S025 are executed with respect to all of the foods and drinks to be served. However, for the task of step S024 concerning the last food/drink, the time of arrival at the destination, in place of the next serving start time, is used.

Figure 15:
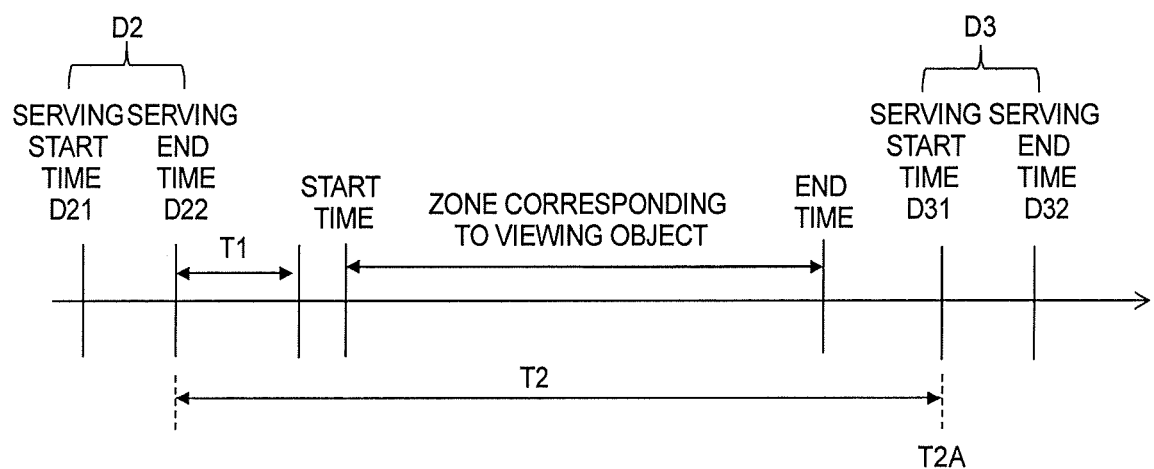
FIG. 15 shows the result of selection of a viewing object to be seen by passengers after serving of food and drink.

FIG. 15 shows the result of selection of a viewing object to be seen by the passengers after serving of a food or drink. In the example shown in FIG. 15, the result of selection of a viewing object to be seen after serving of the food/drink D2 is indicated. The start time of the zone corresponding to the viewing object is later than a point in time at which time T1 elapses from the serving end time D22 of the food/drink D2. Thus, the time T1 in which the passengers 2 concentrates on the food/drink D2 is secured. In the second embodiment, serving of food and drink is mainly considered; thus, the serving start time D31 of the next food/drink D3 is set at the end time T2A of the interval T2. The serving start time D31 is later than the passage end time of the zone corresponding to the viewing object, and serving of the food/drink D3 does not disturb the passengers when they are seeing the viewing object.

The tasks of step S3 and subsequent steps in FIG. 13 are substantially identical with those of the first embodiment, and thus will not be further described. In the second embodiment, the controller (the processor 31 of the server 30) of the information processing device obtains information (serving times) indicating the times at which the first food or drink (food/drink D2) and the second food or drink (food/drink D3) are served to the passengers 2 of the vehicle 10, while the mobile body (vehicle 10) is moving from the start point (point of departure) to the end point (destination) of movement. Also, the processor 31 selects a viewing object to be seen by the passengers 2, during a period from when the time (serving time) for serving the food/drink D2 ends, to when the time (serving time) for serving the next food/drink D3 is started, from a plurality of candidates of viewing objects, based on the information (information indicating the zones corresponding to the viewing objects) indicating a route on which the vehicle 10 moves for viewing, with respect to each of the candidates of the viewing objects. Then, the processor 31 generates information (moving route information) indicating the moving route from the start point to end point of movement, which incorporates the routes (zones) through which the mobile body moves for viewing of the selected viewing objects. Then, the processor 31 outputs the moving route information. The moving route information is received by the terminal 20 of the vehicle 10. The driver of the vehicle 10 moves the vehicle 10, according to the route guidance information displayed on a screen of the car navigation device 17, or on the display 25. Thus, the vehicle 10 moves along the moving route based on the moving route information.

In the second embodiment, the food and drink are served in such timing that the serving does not disturb the passengers 2 when they are seeing the viewing objects, as in the first embodiment. Thus, the passengers 2 can enjoy both eating and drinking, and viewing of the objects, and it is possible to provide the passengers 2 with service that cannot be provided by fixed eating and drinking places. Also, according to the second embodiment, it is possible to automatically produce the route along which the passengers see two or more viewing objects, between the start point and end point of movement, such that viewing of the objects will not disrupt the predetermined timing of serving of food and drink. The tasks of steps S1A and S2A may be performed by the processor 21 of the terminal 20 as the controller of the information processing device.

The first and second embodiments as described above are mere examples, and the disclosure may be embodied with changes as needed, without departing from the principle of the disclosure.

Also, a process described as being performed by a single device may be divided and performed by two or more devices. As an alternative, processes described as being performed by different devices may be performed by a single device. In a computer system, the type of hardware configuration (server configuration) that implements each function may be flexibly changed.

Also, this disclosure may be practiced by supplying a computer program installed with the functions described in each of the above embodiments, to a computer, and causing one or more processors included in the computer to read and run the program. The computer program may be provided to the computer, via a non-temporary computer-readable storage medium that can be connected to a system bus of the computer, or may be provided to the computer via a network. Examples of the non-temporary computer-readable storage medium include, for example, any types of disks, such as magnetic disks (floppy disk (registered trademark), hard disk drive (HDD), etc.), and optical disks (CD-ROM, DVD, blue-ray disk, etc.), read-only memory (ROM), random access memory (RAM), EPROM, EEPROM, magnetic card, flash memory, optical card, and any types of media suitable for storing electronic commands.

What is claimed is:

1. An information processing device comprising a controller including circuitry configured to:
    obtain information concerning a plurality of items of food and drink served to a passenger of a mobile body while the mobile body is moving from a start point to an end point of movement along a traveling course including a plurality of viewing points between the start point and the end point;
    extract a plurality of viewing objects associated with the plurality of viewing points along the traveling course based on images or attributes of one or more of the plurality of items of food and drink along the traveling course;
    generate information indicating timing of serving of each of the items of food and drink to the passenger, based on information indicating a period of time provided for allowing the passenger to see the plurality of viewing objects from the mobile body while the mobile body is moving from the start point to the end point; and
    output, via a display device, the information indicating the timing of serving of each of the items of food and drink to the passenger, so as to provide each of the items of food and drink to the passengers during a serving period of time that is different from the period of time provided for allowing the passenger to see the plurality of viewing objects, in order to provide the passenger with a first time frame for enjoying the plurality of viewing objects without a distraction of the serving of each of the items of food and drink and a second time frame for enjoying the items of food and drink without missing a viewing of the plurality of viewing objects.

2. The information processing device according to claim 1, wherein the controller sets the timing of serving of each of the items of food and drink such that the timing does not overlap the period of time provided for allowing the passenger to see the plurality of viewing objects.

3. The information processing device according to claim 1, wherein the controller sets timing of serving of a first food or drink, among the plurality of items of food and drink, to the passenger, such that the period of time provided for allowing the passenger to see the plurality of viewing objects starts in a case where a predetermined time elapses from an end of serving of the first food or drink.

4. The information processing device according to claim 3, wherein, when a time at which a second food or drink to be served next to the first food or drink is served comes earlier than an end of the period of time provided for allowing the passenger to see the plurality of viewing objects, the controller adjusts the time at which the second food or drink is served, such that the time comes after the end of the period of time provided for allowing the passenger to see the plurality of viewing objects.

5. An information processing method, implemented by circuitry, comprising:
    obtaining information concerning a plurality of items of food and drink served to a passenger of a mobile body while the mobile body is moving from a start point to an end point of movement along a traveling course including a plurality of viewing points between the start point and the end point, by an information processing device;
    extracting a plurality of viewing objects associated with the plurality of viewing points along the traveling course based on images or attributes of one or more of the plurality of items of food and drink along the traveling course;
    generating information indicating timing of serving of each of the items of food and drink to the passenger, by the information processing device, based on information indicating a period of time provided for allowing the passenger to see the plurality of viewing objects from the mobile body while the mobile body is moving from the start point to the end point; and
    outputting, via a display device, the information indicating the timing of serving of each of the items of food and drink to the passenger, by the information processing device, so as to provide each of the items of food and drink to the passengers during a serving period of time that is different from the period of time provided for allowing the passenger to see the plurality of viewing objects, in order to provide the passenger with a first time frame for enjoying the plurality of viewing objects without a distraction of the serving of each of the items of food and drink and a second time frame for enjoying the items of food and drink without missing a viewing of the plurality of viewing objects.

6. A non-transitory computer-readable medium including instructions that cause an information processing device to execute the steps of:
    obtaining information concerning a plurality of items of food and drink served to a passenger of a mobile body while the mobile body is moving from a start point to an end point of movement along a traveling course including a plurality of viewing points between the start point and the end point;
    extracting a plurality of viewing objects associated with the plurality of viewing points along the traveling course based on images or attributes of one or more of the plurality of items of food and drink along the traveling course;
    generating information indicating timing of serving of each of the items of food and drink to the passenger, based on information indicating a period of time provided for allowing the passenger to see all the plurality of viewing objects from the mobile body while the mobile body is moving from the start point to the end point; and outputting, via a display device, the information indicating the timing of serving of each of the items of food and drink to the passenger, so as to provide each of the items of food and drink to the passengers during a serving period of time that is different from the period of time provided for allowing the passenger to see the plurality of viewing objects, in order to provide the passenger with a first time frame for enjoying the plurality of viewing objects without a distraction of the serving of each of the items of food and drink and a second time frame for enjoying the items of food and drink without missing a viewing of the plurality of viewing objects.

7. An information processing device comprising a controller including circuitry configured to:

obtain information indicating a first period of time and a second period of time for serving a first food or drink and a second food or drink, respectively, to a passenger of a mobile body, while the mobile body is moving from a start point to an end point of movement along a traveling course including a plurality of viewing points between the start point and the end point;

extract a plurality of viewing objects associated with the plurality of viewing points along the traveling course based on images or attributes of one or more of the plurality of items of food and drink including the first food or drink and the second food or drink along the traveling course;

select a viewing object to be seen by the passenger, during a period from an end of the first period of time for serving the first food or drink, to a start of the second period of time for serving the second food or drink, from a plurality of candidates of the plurality of viewing objects, based on information indicating a route on which the mobile body moves to see each of the candidates of the viewing objects;

generate information indicating a moving route from the start point to the end point, the moving route incorporating the route on which the mobile body moves to see the viewing object selected; and output, via a display device, the information indicating the moving route including information of the first food or drink and the second food or drink that are associated with a selected one of the plurality of viewing objects and that are to be provided to the passenger during the first period of time and the second period of time, respectively, wherein the first period of time and the second period of time are different from a viewing period of time provided for allowing the passenger to see the selected one of the plurality of viewing objects, in order to provide the passenger with at least a first time frame for enjoying the selected one of the plurality of viewing objects without a distraction of the serving of the first food or drink and the second food or drink and at least a second time frame for enjoying the first food or drink and the second food or drink associated with the selected one of the plurality of viewing objects without missing a viewing of the selected one of the plurality of viewing objects.

8. An information processing method, implemented by circuitry, comprising:

obtaining information indicating a first period of time and a second period of time for serving a first food or drink and a second food or drink, respectively, to a passenger of a mobile body, while the mobile body is moving from a start point to an end point of movement along a traveling course including a plurality of viewing points between the start point and the end point by an information processing device;

extracting a plurality of viewing objects associated with the plurality of viewing points along the traveling course based on images or attributes of one or more of the plurality of items of food and drink including the first food or drink and the second food or drink along the traveling course;

selecting a viewing object to be seen by the passenger, during a period from an end of the first period of time for serving the first food or drink, to a start of the second period of time for serving the second food or drink, from a plurality of candidates of the plurality of viewing objects, by the information processing device, based on information indicating a route on which the mobile body moves to see each of the candidates of the viewing objects;

generating information indicating a moving route from the start point to the end point, by the information processing device, the moving route incorporating the route on which the mobile body moves to see the viewing object selected; and outputting, via a display device, the information indicating the moving route, by the information processing device, including information of the first food or drink and the second food or drink that are associated with a selected one of the plurality of viewing objects and that are to be provided to the passenger during the first period of time and the second period of time, respectively, wherein the first period of time and the second period of time are different from a viewing period of time provided for allowing the passenger to see the selected one of the plurality of viewing objects, in order to provide the passenger with at least a first time frame for enjoying the selected one of the plurality of viewing objects without a distraction of the serving of the first food or drink and the second food or drink and at least a second time frame for enjoying the first food or drink and the second food or drink associated with the selected one of the plurality of viewing objects without missing a viewing of the selected one of the plurality of viewing objects.

9. A non-transitory computer-readable medium including instructions that cause an information processing device to execute the steps of:

obtaining information indicating a first period of time and a second period of time for serving a first food or drink and a second food or drink, respectively, to a passenger of a mobile body, while the mobile body is moving from a start point to an end point of movement along a traveling course including a plurality of viewing points between the start point and the end point;

extracting a plurality of viewing objects associated with the plurality of viewing points along the traveling course based on images or attributes of one or more of the plurality of items of food and drink including the first food or drink and the second food or drink along the traveling course;

selecting a viewing object to be seen by the passenger, during a period from an end of the first period of time for serving the first food or drink, to a start of the second period of time for serving the second food or drink, from a plurality of candidates of the plurality of viewing objects, based on information indicating a route on which the mobile body moves to see each of the candidates of the viewing objects;

generating information indicating a moving route from the start point to the end point, the moving route incorporating the route on which the mobile body moves to see the viewing object selected; and outputting, via a display device, the information indicating the moving route including information of the first food or drink and the second food or drink that are associated with a selected one of the plurality of viewing objects and that are to be provided to the passenger during the first period of time and the second period of time, respectively, wherein the first period of time and the second period of time are different from a viewing period of time provided for allowing the passenger to see the selected one of the plurality of viewing objects, in order to provide the passenger with at least a first time frame for enjoying the selected one of the plurality of viewing objects without a distraction of the serving of the first food or drink and the second food or drink and at least a second time frame for enjoying the first food or drink and the second food or drink associated with the selected one of the plurality of viewing objects without missing a viewing of the selected one of the plurality of viewing objects.

* * * * *